US009409583B1

(12) United States Patent  
Bors

(10) Patent No.: US 9,409,583 B1  
(45) Date of Patent: Aug. 9, 2016

(54) SPHERICAL HAULING DEVICE

(71) Applicant: William Bors, Vermilion, OH (US)

(72) Inventor: William Bors, Vermilion, OH (US)

(*) Notice: Subject to any disclaimer, the term of this patent is extended or adjusted under 35 U.S.C. 154(b) by 0 days.

(21) Appl. No.: 14/644,730

(22) Filed: Mar. 11, 2015

(51) Int. Cl.  
*A63B 47/00* (2006.01)  
*B62B 1/12* (2006.01)

(52) U.S. Cl.  
CPC ....................... *B62B 1/12* (2013.01)

(58) Field of Classification Search  
CPC ........ B62B 1/12; A45C 5/141; A45C 13/262; A45C 13/12  
USPC ............................................................ 280/19  
See application file for complete search history.

(56) References Cited

U.S. PATENT DOCUMENTS

| | | | |
|---|---|---|---|
| 546,429 A | 9/1895 | O'Neall | |
| 2,080,786 A * | 5/1937 | Robles | B65D 43/00 160/132 |
| 3,190,300 A * | 6/1965 | Wear | E04H 15/003 135/126 |
| 3,604,671 A * | 9/1971 | Walker | H01M 6/48 220/489 |
| 3,708,803 A * | 1/1973 | Teaff | A42B 1/201 2/171.01 |
| 3,794,054 A * | 2/1974 | Watts | E04H 15/28 135/117 |
| 3,802,451 A * | 4/1974 | Morris | A45B 19/02 135/20.2 |
| 3,844,301 A * | 10/1974 | Harrell | A45B 19/00 135/15.1 |
| 3,873,119 A * | 3/1975 | Koch | A63B 47/007 280/47.131 |
| 4,063,637 A * | 12/1977 | Danforth | A42B 3/006 206/8 |
| 4,098,281 A * | 7/1978 | Bonfilio | E04H 15/38 135/118 |
| 4,160,495 A | 7/1979 | Conard | |
| 4,181,235 A * | 1/1980 | Baysinger | B65D 88/04 114/74 A |
| 4,247,117 A * | 1/1981 | Reichert | A63B 69/0086 473/424 |
| 4,287,840 A * | 9/1981 | Weidner | A01G 23/04 111/101 |
| 4,291,417 A * | 9/1981 | Pagano | A42B 1/201 2/202 |
| 4,355,650 A * | 10/1982 | Beaudry | E04H 15/38 135/118 |
| 5,159,947 A * | 11/1992 | Chuang | E04H 15/38 135/132 |
| 5,234,833 A | 8/1993 | Artis | |
| 5,377,626 A * | 1/1995 | Kilsby | A01K 27/004 119/796 |

(Continued)

FOREIGN PATENT DOCUMENTS

| | | |
|---|---|---|
| WO | WO8403821 | 10/1984 |
| WO | WO9520553 | 8/1995 |
| WO | WO0238000 | 5/2002 |

*Primary Examiner* — Brodie Follman  
*Assistant Examiner* — Brian Cassidy  
(74) *Attorney, Agent, or Firm* — Goldstein Law Offices, P.C.

(57) ABSTRACT

A spherical hauling device for moving foliage and waste. The device includes an operably expandable and collapsible frame generally spherical in shape when in an expanded position, and nearly flat when collapsed. The frame includes a pair of directly opposing hubs having coaxial hub axes of rotation, and a plurality of ribs exiting each hub radially and arching towards the opposing hub. Each hub has at least one track within which the ribs rotate between the expanded and collapsed positions. The device further includes an outer shell spanning the frame for containing the foliage and waste when the device is expanded. The outer shell can include a plurality of panels operably coupled to and extending between adjacent ribs. A yoke is operably coupled to each hub and includes at least one of a shaft and a retractible cord for rolling the device over variable terrain.

11 Claims, 10 Drawing Sheets

(56) References Cited

U.S. PATENT DOCUMENTS

| | | | | |
|---|---|---|---|---|
| 5,470,747 A * | 11/1995 | Sikorski | C05F 17/0205 | 220/4.21 |
| 5,564,369 A * | 10/1996 | Barber | A01K 61/006 | 119/221 |
| 5,842,495 A * | 12/1998 | Egnew | E04H 15/38 | 135/114 |
| 5,887,550 A * | 3/1999 | Levine | A01K 27/004 | 119/796 |
| 6,116,064 A * | 9/2000 | Driscoll | B62J 11/005 | 70/58 |
| 6,612,946 B1 * | 9/2003 | McClain | A63B 47/00 | 206/315.9 |
| 6,712,026 B1 * | 3/2004 | Carville, Jr. | A01K 27/004 | 119/794 |
| D528,257 S | 9/2006 | Leclerc et al. | | |
| 7,367,482 B1 * | 5/2008 | Witherspoon, Jr. | A45C 11/24 | 206/1.5 |
| D674,570 S | 1/2013 | Neuhaus | | |
| 8,375,968 B2 * | 2/2013 | Whybrew | A63G 13/02 | 114/345 |
| 8,528,652 B2 * | 9/2013 | Al Thawad | A62C 3/02 | 169/11 |
| 8,714,111 B2 * | 5/2014 | Bryson | A01K 1/0245 | 119/453 |
| 8,720,655 B2 * | 5/2014 | King | A45C 13/385 | 190/18 A |
| 8,985,538 B2 * | 3/2015 | Rapoport | B62J 7/08 | 248/305 |
| 9,115,508 B2 * | 8/2015 | Rapoport | B60P 7/06 | |
| 2004/0050637 A1 | 3/2004 | Scott | | |
| 2006/0063621 A1 * | 3/2006 | Bell | A63B 47/00 | 473/569 |
| 2008/0029564 A1 * | 2/2008 | Wong | A45F 3/14 | 224/600 |
| 2009/0057083 A1 * | 3/2009 | Serrano | A45C 5/141 | 190/18 A |
| 2012/0079972 A1 * | 4/2012 | Smith | F23G 7/10 | 110/346 |
| 2012/0329625 A1 * | 12/2012 | MacColl | A63B 43/04 | 482/142 |
| 2013/0037591 A1 * | 2/2013 | Ostenbridge | A45C 3/00 | 224/607 |
| 2014/0096489 A1 * | 4/2014 | Parry | D06F 95/002 | 53/467 |

\* cited by examiner

US 9,409,583 B1

SPHERICAL HAULING DEVICE

TECHNICAL FIELD

The present disclosure relates generally to a hauling device. More particularly, the present disclosure relates to a spherical hauling device having a collapsible and deployable frame.

BACKGROUND

Current methods for performing yard work and landscaping can be back breaking and laborious. A person can spend hours raking and shoveling foliage and waste into numerous piles, only to have to bend again to move the individual piles of leaves into a bag or disposal container which is prone to ripping or breaking, and which is not easily maneuvered. Further, the bag is made increasingly heavy with every additional piece of foliage and waste. The person often then moves from pile to pile, laboriously pulling the weighty bag behind him.

When landscaping over rough or uneven terrain, the person is often completely unable to bring the bag towards the foliage and waste. As a result, the person must then employ a separate piece of equipment, such as a leaf blower, to move the foliage and waste towards a bagging or disposal area. Leaf blowers, however, are often very expensive and not easily maneuvered by many users. Additionally, people often encounter similar laboring conditions when trying to convey heavy bags of yard materials, such as mulch, fertilizer, and stones, towards a certain location for its use.

A range of foliage and waste-containing devices have been developed to best streamline the storage, transferral, and combustion of such foliage and waste. Many of these devices, however, often include an array of parts and panels which must be assembled each time before the device is engaged. Once assembled, however, they often provide inadequately sized openings which prohibit a user from effortlessly and seamlessly transferring the foliage thereto. Yet another device includes separate wheels upon which the device rides when it is moved. These wheels, however, are often not equipped to ride over variable terrains.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a unitary device which can be deployed in variable settings for containing foliage and waste. Accordingly, the present disclosure provides a spherical hauling device including a frame which is nearly flat when collapsed to enhance its portability, and generally spherical in shape when expanded.

Another aspect of an example in the present disclosure provides the spherical hauling device which can be easily manipulated between the expanded and collapsed positions. Accordingly, the frame includes a pair of directly opposing hubs and a plurality of ribs exiting each hub radially and arching towards the opposing hub. The ribs can be independently rotated around the hub to create the spherical shape.

A further aspect of an example embodiment in the present disclosure provides the spherical hauling device including an outer shell for containing the foliage and the waste. Accordingly, the present disclosure provides the frame including a plurality of panels operably coupled to and expanding between adjacent ribs to define an interior volume into which foliage and waste can be transferred and contained.

Yet a further aspect of an example embodiment in the present disclosure provides a spherical hauling device which can be easily maneuvered over different terrains. Accordingly, the present disclosure provides the device including a yolk for guiding and rolling the spherical device between variable locations or settings.

Accordingly, the present disclosure describes a spherical hauling device for moving foliage and waste. The device includes an operably expandable and collapsible frame generally spherical in shape when in an expanded position, and nearly flat when collapsed. The frame includes a pair of directly opposing hubs having coaxial hub axes of rotation, and a plurality of ribs exiting each hub radially and arching towards the opposing hub. Each hub has at least one track within which the ribs rotate between the expanded and collapsed positions. The device further includes an outer shell spanning the frame for containing the foliage and waste when the device is expanded. The outer shell can include a plurality of panels operably coupled to and extending between adjacent ribs. A yoke is operably coupled to each hub and includes at least one of a shaft and a retractible cord for rolling the device over variable terrain.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 2:
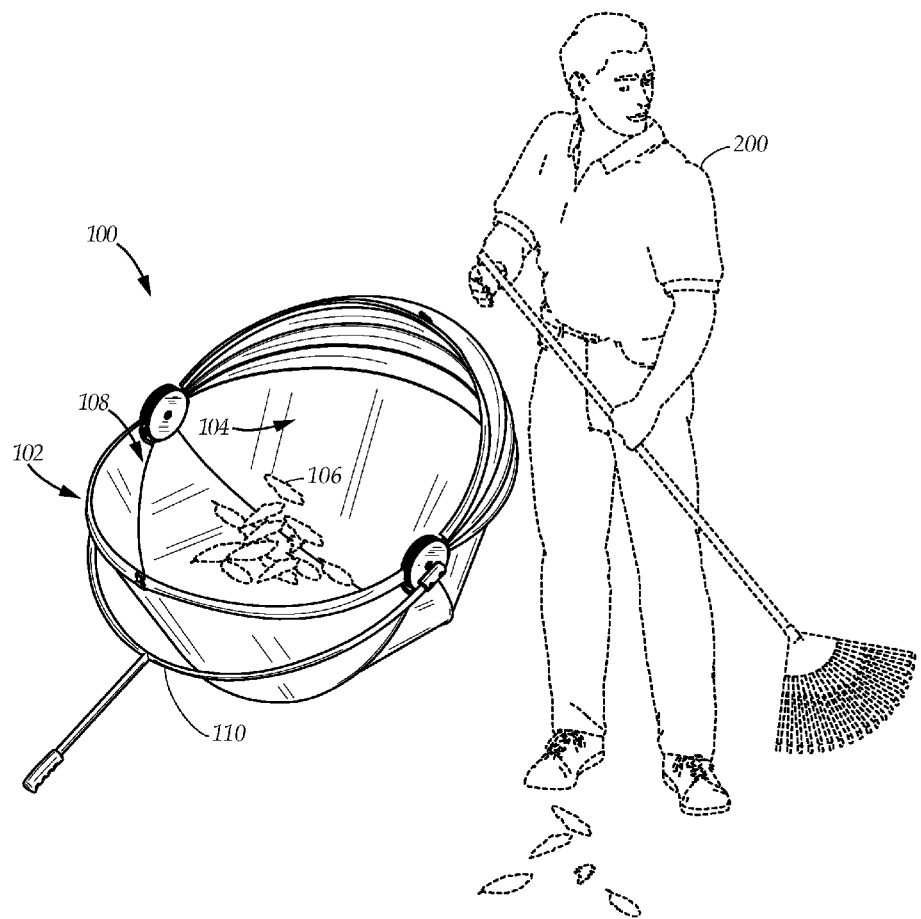
FIG. 2 is a diagrammatic perspective view of the device, partially expanded and in use by a user shown in broken lines, for containing and hauling foliage and waste, according to the present disclosure.

FIG. 2 illustrates a unitary spherical hauling device 100 including an operably expandable and collapsible frame 102, and an outer shell 104 spanning the frame for containing and moving foliage 106 and other forms of waste. It can be employed in variable settings, such as outdoors, such as in a yard or a construction site, and indoors for containing similar forms of debris. The device 100 seamlessly transitions between an collapsed position and an expanded position to create an internal volume 108 within which the foliage 106 and waste can be contained. Further, the device 100 can be incrementally expanded to create an internal volume 108 which grows with the increasing amount of foliage and waste disposed therein by a user 200. The spherical shape of the device 100, and a yolk 110 operably coupled thereto, enable the user 200 to roll the device 100 to the user's desired locations.

Figure 4:
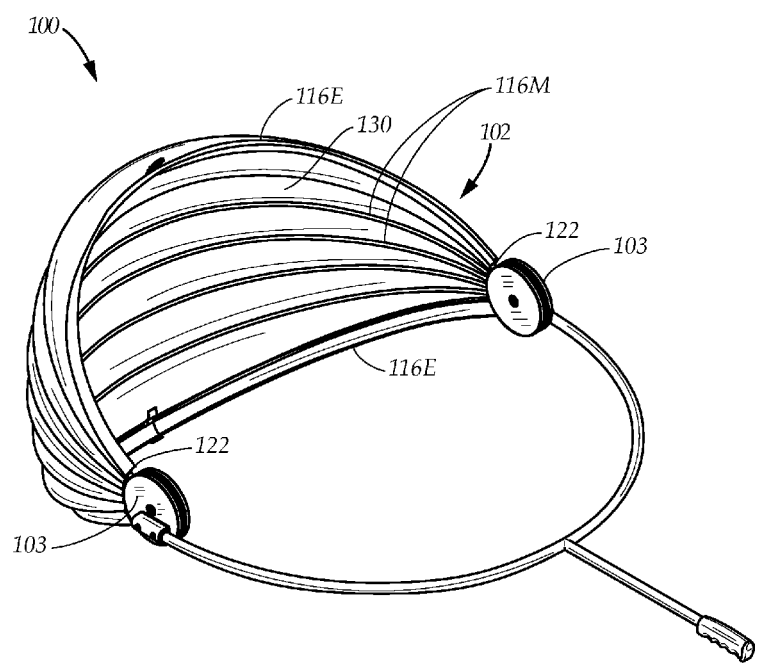
FIG. 4 is a diagrammatic perspective view of the device in a fully collapsed position, according to the present disclosure.

FIG. 4 illustrates the device in a collapsed position. The device includes the frame 102. The frame 102 is nearly flat when in the collapsed position, as illustrated in FIG. 4, such that it enables the user to carry the device 100 between settings and store it for later use with minimal effort. The frame 102 includes a pair of directly opposing hubs 103 spaced apart and parallel to each other.

Figure 5:
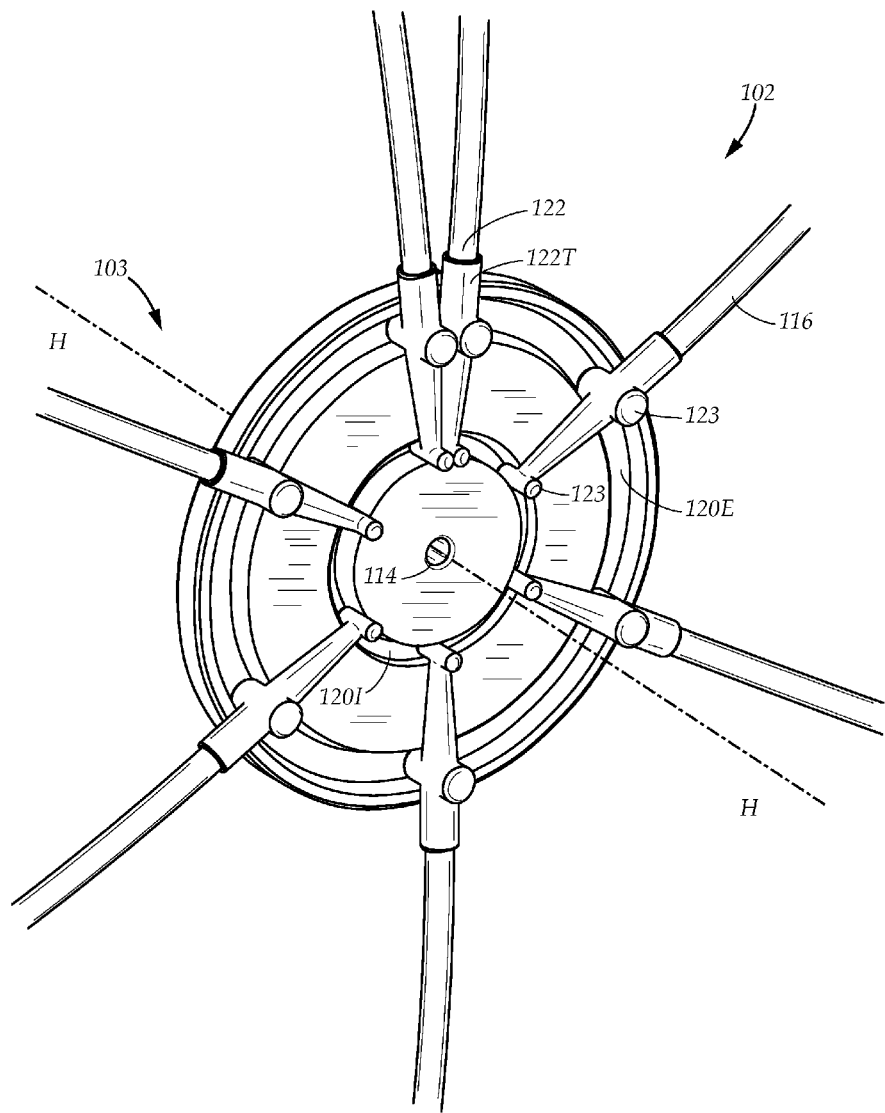
FIG. 5 is a diagrammatic, perspective view of an example embodiment of an inner half portion of a hub including a pair of tracks within which the ribs pivot when transitioning between the collapsed and expanded positions, according to the present disclosure.

Referring now to FIGS. 4 and 5 together, each hub 103 has a center 114 and a fixed hub axis of rotation (H) which is coaxial with the other hub. The frame 102 further includes a plurality of ribs 116 including a pair of extreme arcuate ribs 116E and a plurality of arcuate intermediary ribs 116M. The ribs 116 exit each hub 103 radially and arch towards the opposing hub 103. The ribs 116 can be slightly flexible, such as comprising spring steel, such that the device 100 is biased towards the collapsed position. Alternatively, the ribs 166 can be substantially rigid, such as comprising fiberglass material.

Figure 6:
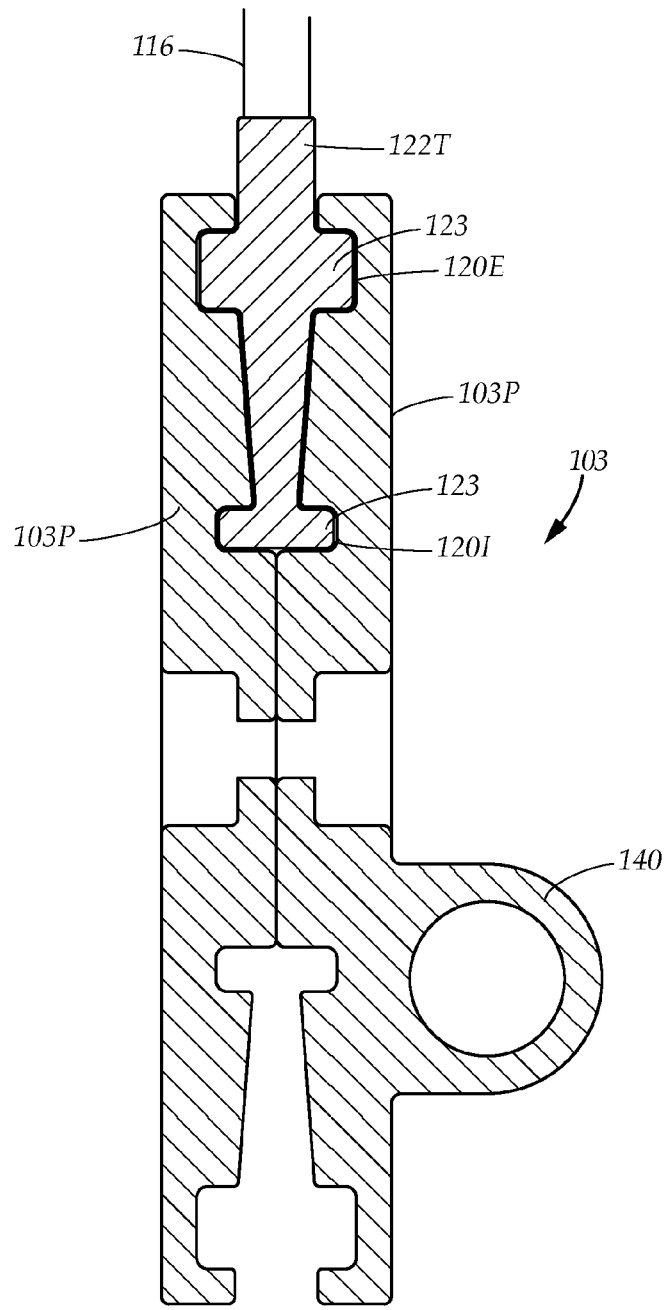
FIG. 6 is a side elevational, cross sectional view of a hub illustrating the orientation of the ribs within the tracks of the hub, according to the present disclosure.

In the example embodiment illustrated in FIG. 5, the ribs 116 are configured for independently pivoting within each hub 103 around the hub axis H to operably expand and collapse the device. More particularly, each of the hubs 103 has at least one track 120 extending circumferentially around the hub center 114. Each of the ribs 116 has a pair of ends 122 having a rib tip 122T, such as a peg, configured for rotating within the track 120. However, it is understood that the ribs 116 can rotate using such means as magnets, mating fasteners, and hinges. In the example embodiment illustrated in FIG. 6, the hub 103 is comprised of a pair of directly opposed mating plates 103P configured for coupling together to enclose the rib tip 122T therebetween. It is understood, however, that the hub can also be a unitary and/or solid piece. Each track 120 guides the ribs 116 around the hub axis H when rotating between the expanded and collapsed positions. In FIG. 6, each of the hub plates 103P includes a pair of concentric tracks 120, an outer track 120E and an inner track 120I for stabilizing and anchoring the rib 116 as it rotates around the hub axis H. The tracks 120 in each hub plate 103P are substantially aligned with the tracks of the directly opposing hub plate. The space between the outer and inner tracks 120E, 120I, and between the inner track 120I and the hub center 114 can be uniform and/or variable. The rib tips 122T have a length and include a pair of projections 123 extending outwardly therefrom, each projection configured for riding within a track 120. Accordingly, the spacing of the projections 123 along the length of the rib tip 122T mirrors the spacing between the outer and inner tracks. The hub can further include a locking mechanism such that the ribs can be expanded and collapsed, in turn, for creating internal volumes of variable sizes and/or to orient the extreme ribs such that they frame openings of varying widths. Yet further, in an example embodiment (not illustrated), both the hubs and the ribs are configured for rotating to transition the frame between the collapsed and expanded positions.

Figure 1:
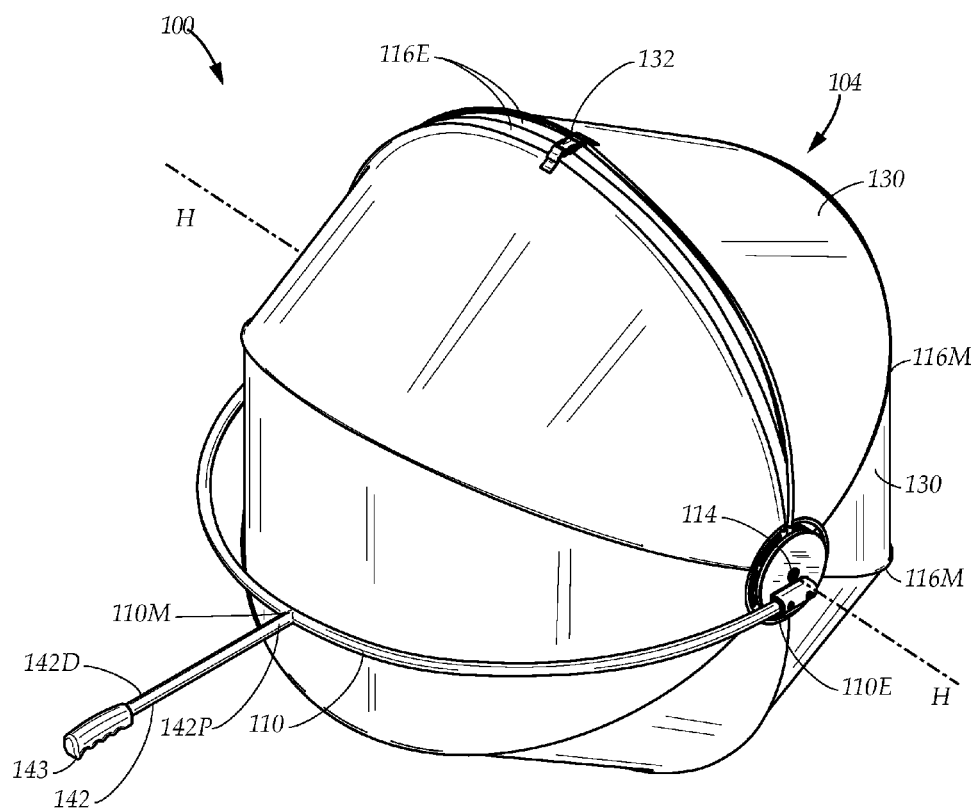
FIG. 1 is a diagrammatic perspective view of an example embodiment of a spherical hauling device including a frame with a plurality of arcuate ribs extending between a pair of opposing hubs, according to the present disclosure.

FIGS. 1 and 5 illustrate the device 100 rotated around the hub axis towards the fully expanded position wherein the extreme ribs 116E are nearly touching. When in the expanded position, the frame 102 is spherical in shape. The device 100 includes the outer shell 104 spanning the frame 102 and creating the spherical internal volume for containing the foliage and waste. The shell 104 includes a plurality of panels 130. The panels 130 can be substantially elastic, such that the device is biased towards the collapsed position. The panels 130 can also be substantially rigid. A panel 130 is operably coupled to and extends between adjacent ribs 116, as illustrated in FIG. 1. Alternatively, the panels 130 can extend continuously around the frame 102. Referring momentarily to FIG. 4, the panels 130 can collapse, such as accordian-fold, between adjacent ribs 116 when the frame 102 is in the collapsed position. When thus configured, the ribs 116 are nearly in contact with one another. The panels 130 can expand partially and/or fully whereupon the ribs 116 are rotated outwardly until the extreme ribs 116E are nearly in contact with each other.

The device 100 can further include a fastener 132, such as a mating fastener, for securing the device in the expanded position. In FIG. 1, the fastener 132 is operably coupled adjacent the extreme ribs 116E. Such fastener 132 includes, but is not limited to, a hook and eye fastener, a velcro fastener, a buckle, a tape, a button and loop, and/or a glue.

Figure 3:
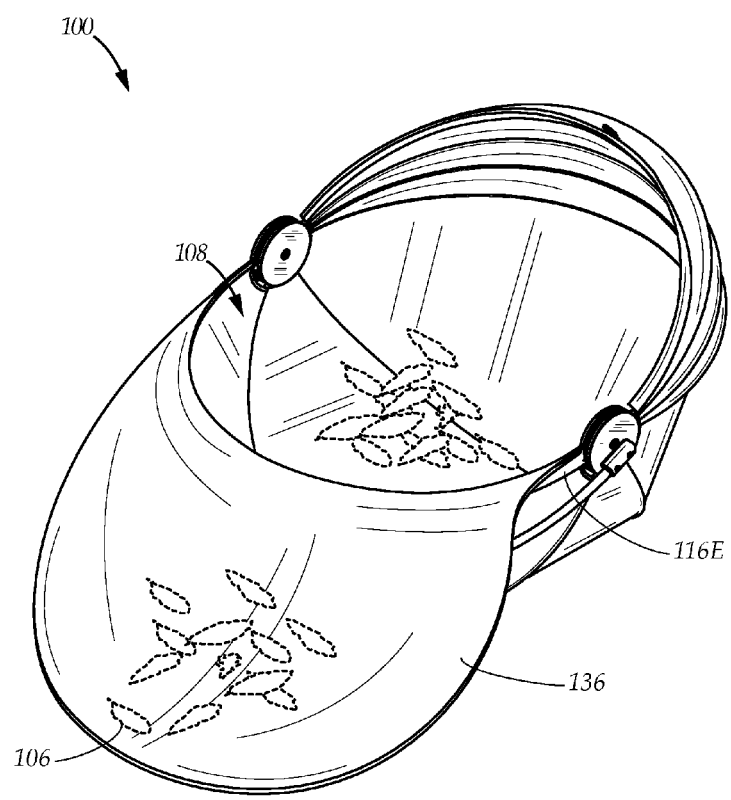
FIG. 3 is a diagrammatic perspective view of the device including a tongue for further enabling the transfer of foliage and waste to the device, according to the present disclosure.

FIG. 3 further illustrates the device 100 including a tongue 136 configured for extending from the interior volume 108 of the device 100 for providing a surface upon which said foliage 106 and waste can be positioned while being transferred to the device 100. The tongue 136 is operably coupled to at least one of the ribs 116, such as one of the extreme ribs 116E. The tongue 136 can be folded inwardly towards the device 100 to dispose of the foliage 106 and the waste within the interior volume 108, and to return the tongue 136 therein.

Figure 7:
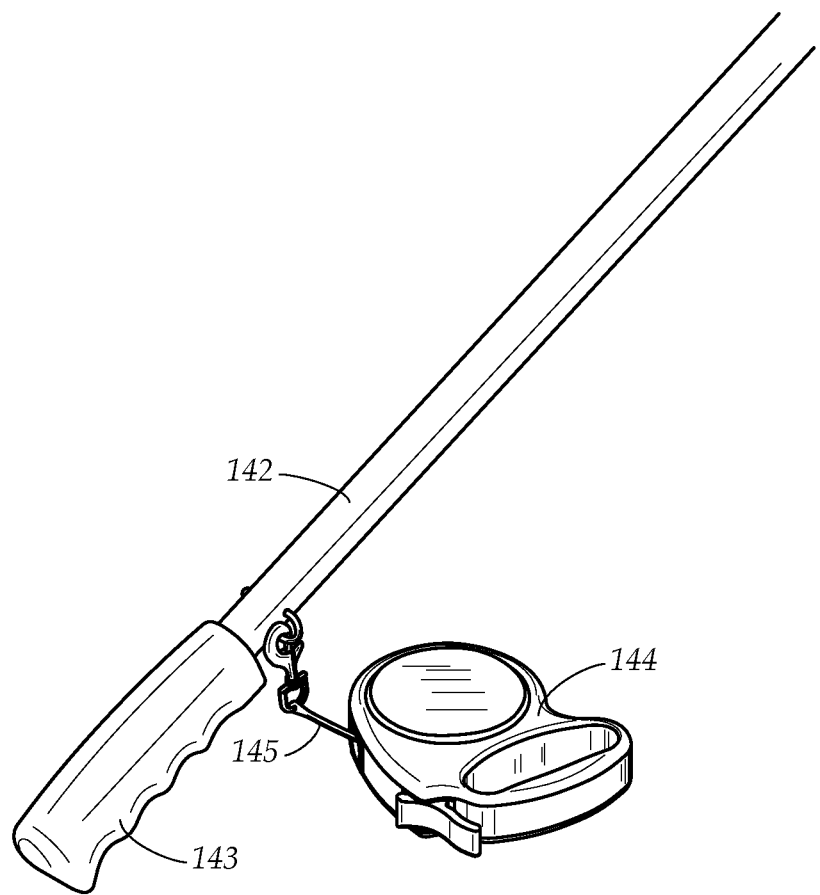
FIG. 7 is a diagrammatic perspective view of a first handle including a shaft and a second handle including a retractible cord, according to the present disclosure.

Referring now to FIGS. 1 and 6 cooperatively, the device 100 can further include a substantially rigid yoke 110 having a pair of ends 110E and a midpoint 110M between the yolk ends. Each of the yolk ends 110E can be operably coupled adjacent the hub centers 114. In FIG. 6, the hubs 103 include an eye 140 for anchoring the yolk ends 110E. The yoke 110 can include a substantially rigid shaft 142 having a proximal end 142P, and a distal end 142D extending outwardly from the yolk midpoint 110M. The distal end 142D can include a hand grip 143. Further, FIG. 7 illustrates the shaft 142 including a retractible handle 144 and cord 145. It is understood, however, that the retractible handle and cord 144,145, and other similar handles can be coupled directed to the midpoint of the yolk. Both the shaft 142 and the retractible handle 144 and cord 145 can be used independently and/or cooperatively to enable the user to haul and roll the spherical device 100.

Figure 8A:
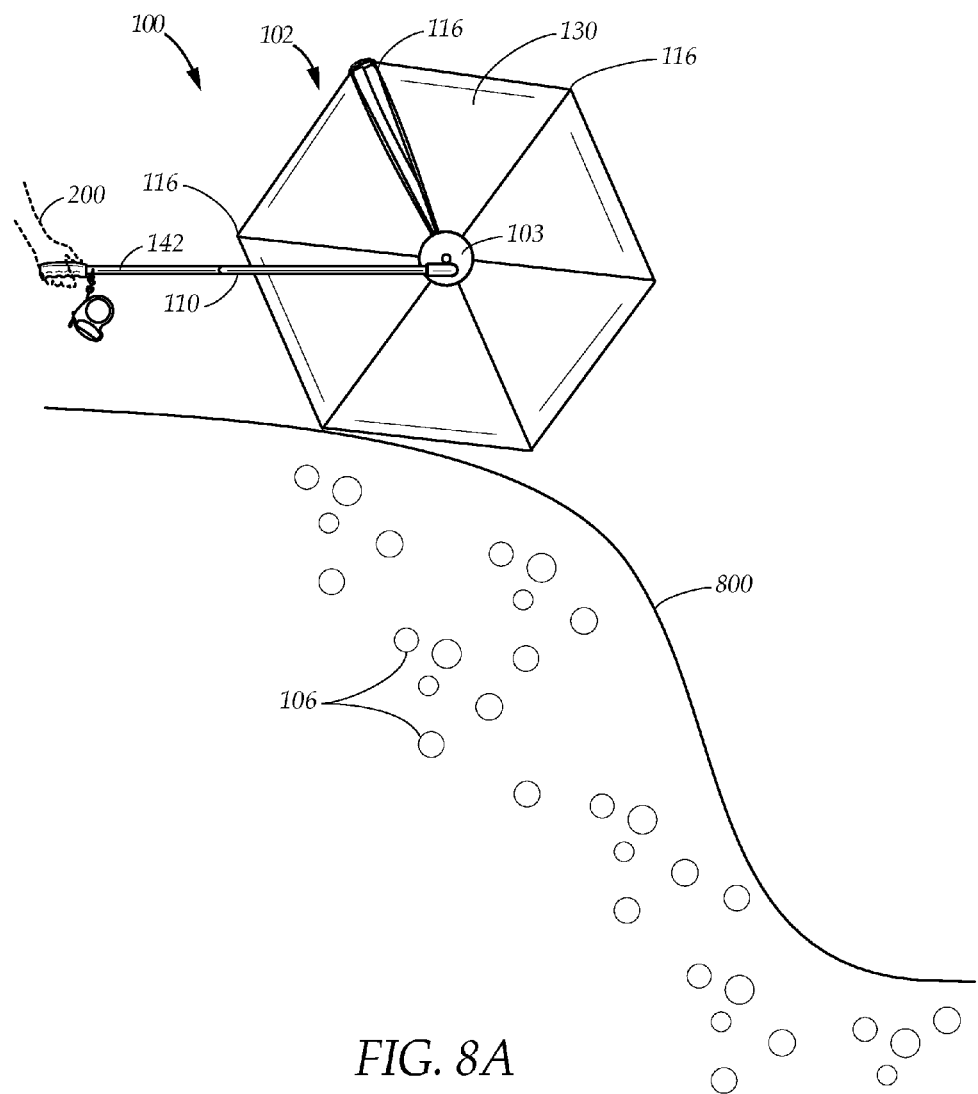
FIG. 8A is a diagrammatic perspective view of the device being held at the top of a slope by a user via the first handle, according to the present disclosure.
Figure 8B:
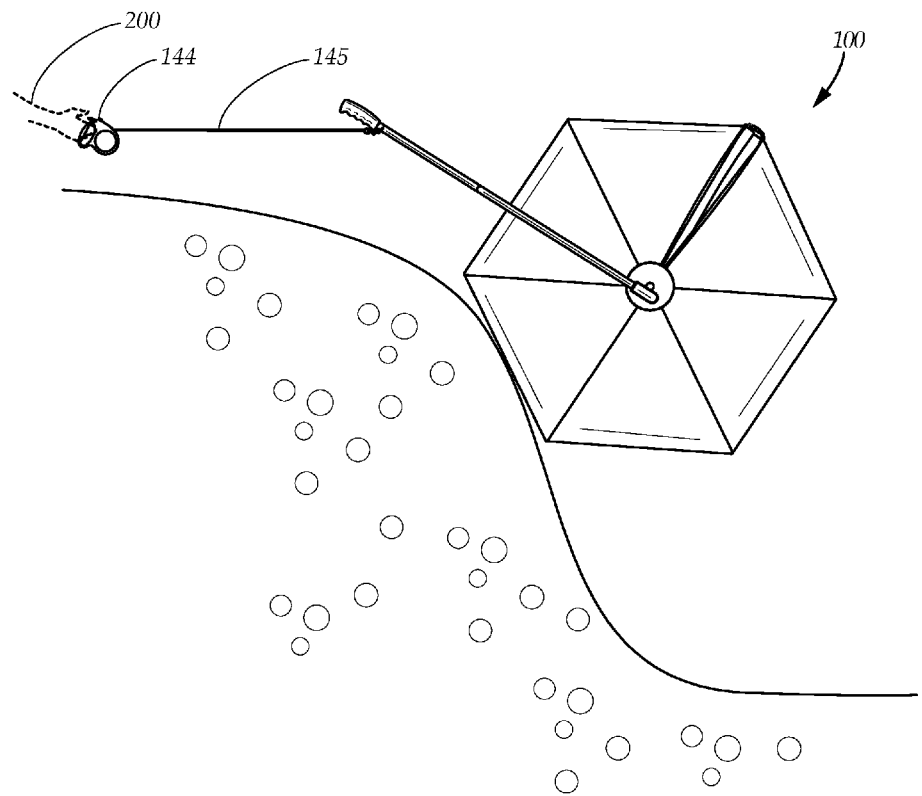
FIG. 8B is a diagrammatic perspective view of the device rolling down the slope via the second handle with the cord partially drawn out, according to the present disclosure.
Figure 8C:
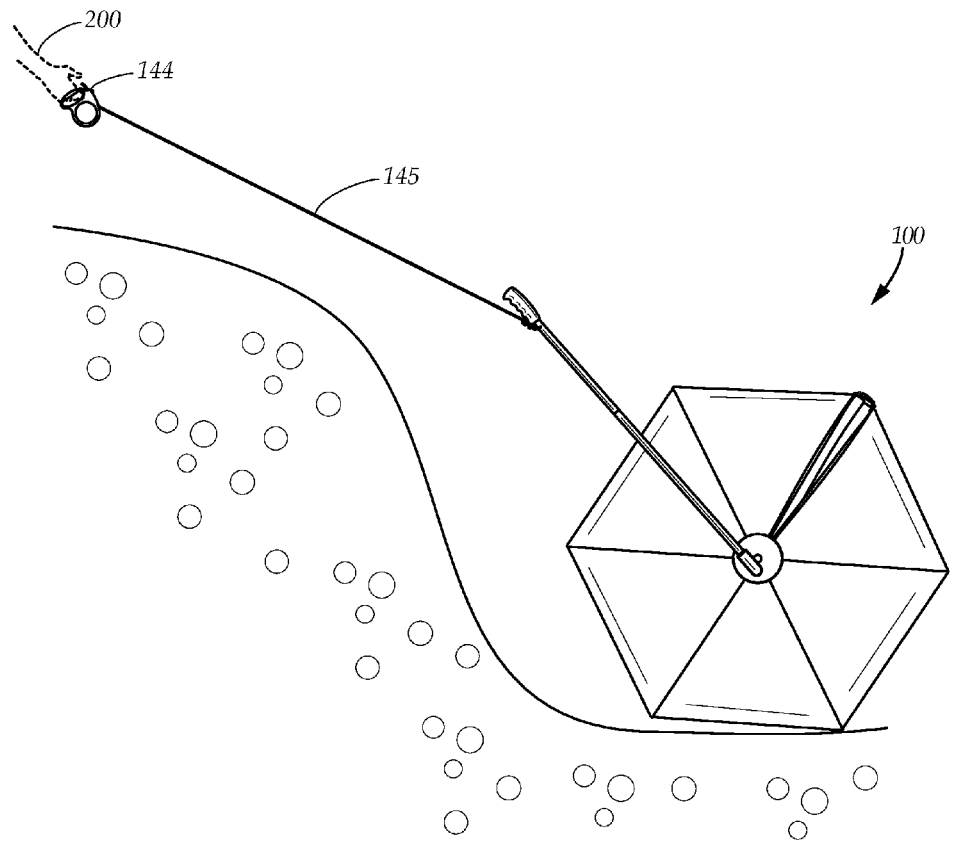
FIG. 8C is a diagrammatic perspective view of the device at the bottom of the slope with the cord fully drawn out before it is retracted within the handle, according to the present disclosure.

FIGS. 8A, 8B, and 8C illustrates a method for using the device 100, especially over variable terrain, such as a hill 800. The device 100 has been expanded such that it is generally spherical in shape. The user 200 can then selectively expand and collapse the ribs 116 and the panels 130 of the frame 102 to transfer and contain the foliage 106 and waste disposed along the hill 800, to the device 100. The device 100 is configured for rolling around the hub axis via the yolk 100, as described hereinabove. More particularly, the device 100 can be rolled to the edge of the hilltop via the shaft 142. Rather than continuing to hold the shaft 142 while trying to descend the hill 800 with the weight and the increasing acceleration of the spherical device 100 making such descent potentially unsafe and cumbersome, the user 200 then engages the retractible handle 144 and cord 145, as illustrated in FIG. 8B, to ease and roll the spherical device 100 down the hill 800. The user 200 can let the weight of the foliage and waste within the device 100 pull the cord 145 from the associated handle 144 until the device 100 rests at the bottom of the hill 800, as illustrated in FIG. 8C. It is understood that the steps of rolling the device down the hill can be reversed for hauling and rolling the weighted device up the hill, and over variable other surfaces.

While described in the context of a sphere, it is understood that the device 100 can also be expanded to form such rounded shapes as a cylinder, hexagonal prism, spheroid, dodecahedron without departing from the principles of the claimed invention as disclosed herein.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a spherical hauling device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A spherical hauling device for containing and moving foliage and waste, comprising:
    an operably expandable and collapsible frame, said frame is generally spherical in shape when in an expanded position and nearly flat when in a collapsed position, the frame including a pair of directly opposing hubs spaced apart and parallel to each other, each hub having a center and a fixed hub axis of rotation which is coaxial with the other hub, the frame including a pair of extreme arcuate ribs and a plurality of arcuate intermediary ribs, the ribs exiting each hub radially and arching towards the opposing hub, the ribs configured for independently pivoting within each hub around the hub axis to operably expand and collapse the device, at least one of said ribs includes a tongue; and
    an outer shell spanning the frame for creating a substantially closed internal spherical volume for containing said foliage and waste when said frame is in an expanded position, wherein the tongue is configured for extending from the interior volume of the device for providing a surface upon which said foliage and waste can be positioned while being transferred to the device whereupon said tongue is folded inwardly towards the device and returned to the interior volume.

2. The spherical hauling device as described in claim 1, wherein each of said ribs has a pair of ends, each end having a rib tip, and each of said hubs having at least one track extending circumferentially around its hub center within which the rib tips are configured to rotate, each track guiding the ribs between the expanded and collapsed positions.

3. The spherical hauling device as described in claim 1, wherein said shell includes a plurality of panels, each panel operably coupled to and extending between adjacent ribs, the panels collapsing between said adjacent ribs when the frame is in the collapsed position wherein the ribs are nearly in contact with one another, the panels defining the interior spherical volume when said frame is in the expanded position such that the ribs are rotated outwardly until the extreme ribs are nearly in contact with each other.

4. The spherical hauling device as described in claim 3, wherein the extreme ribs include a fastener for securing the device in the expanded position.

5. The spherical hauling device as described in claim 4, wherein said panels are substantially elastic such that the device is biased towards the collapsed position when said fastener is uncoupled.

6. The spherical hauling device as described in claim 5, wherein said panels extend continuously extend around said frame.

7. The spherical hauling device as described in claim 1, wherein said frame includes a substantially rigid yoke having a pair of ends and a midpoint between the yolk ends, each end operably coupled adjacent the center of one of the hubs, and wherein said yolk includes at least one of a rigid shaft and a retractable cord extending outwardly from the midpoint of the yoke for more efficiently rolling said device over variable terrain.

8. A spherical hauling container for moving foliage and waste, comprising:
   an operably expandable and collapsible frame, said frame is generally spherical in shape when in an expanded position and nearly flat when in a collapsed position, said frame including a pair of directly opposing hubs spaced apart and parallel to each other, each hub having a center and a fixed hub axis of rotation which is coaxial with the other hub, wherein the frame includes a pair of extreme arcuate ribs and a plurality of arcuate intermediary ribs, each of said ribs having a pair of ends, each end having a rib tip, the ribs exiting each hub radially and arching towards the opposing hub, each of said hubs having at least one track extending circumferentially around its hub center within which the rib tips are configured to independently rotate around the hub axis, each track guiding the ribs between the expanded and collapsed positions, and wherein at least one of said ribs includes a tongue;
   an outer shell spanning the frame for creating a substantially closed internal spherical volume for containing said foliage and waste when said frame is in an expanded position, the tongue configured for extending from the internal for providing a surface upon which said foliage and waste can be positioned while being transferred to the device whereupon said tongue is folded inwardly towards the device and returned to the interior volume; and
   a substantially rigid yoke having a pair of ends and a midpoint between the yolk ends, each end operably coupled adjacent the center of one of the hubs, said yolk including at least one of a rigid shaft and a retractable cord extending outwardly from the midpoint of the yoke, wherein a user can exert a maneuvering force on the device via the yolk to roll said container over variable terrain when the container is in the expanded position.

9. The spherical hauling container as described in claim 8, wherein said shell includes a plurality of panels, each panel operably coupled to and extending between adjacent ribs, the panels collapsing between said adjacent ribs when the frame is in the collapsed position wherein the ribs are nearly in contact with one another, the panels defining the interior spherical volume when said frame is in the expanded position such that the ribs are rotated outwardly until the extreme ribs are nearly in contact with each other.

10. The spherical hauling container as described in claim 9, wherein the extreme ribs include a fastener for securing the device in the expanded position.

11. The spherical hauling container as described in claim 9, wherein said panels extend continuously extend around said frame.

* * * * *